Jan. 26, 1960 C. F. FREY 2,922,881

MANUAL CONTROL HAVING ROTATABLE AND TILTABLE STEPPED CAM FOR TELEVISION TUNER

Filed April 18, 1955 9 Sheets-Sheet 1

INVENTOR.
CLEON F. FREY

BY Ostrolenk & Faber
ATTORNEYS

Jan. 26, 1960 C. F. FREY 2,922,881

MANUAL CONTROL HAVING ROTATABLE AND TILTABLE STEPPED CAM FOR TELEVISION TUNER

Filed April 18, 1955 9 Sheets-Sheet 2

INVENTOR.
CLEON F. FREY

By Ostrolenk & Faber

ATTORNEYS

INVENTOR.
CLEON F. FREY
BY
Ostrolenk & Faber
ATTORNEYS

Jan. 26, 1960

C. F. FREY

MANUAL CONTROL HAVING ROTATABLE AND TILTABLE STEPPED CAM FOR TELEVISION TUNER 2,922,881

Filed April 18, 1955

9 Sheets-Sheet 4

INVENTOR.
CLEON F. FREY

BY

Ostrolenk & Faber

ATTORNEYS

Jan. 26, 1960 C. F. FREY 2,922,881

MANUAL CONTROL HAVING ROTATABLE AND TILTABLE STEPPED CAM FOR TELEVISION TUNER

Filed April 18, 1955 9 Sheets-Sheet 5

INVENTOR.
CLEON F. FREY

BY

Ostrolenk & Faber

ATTORNEYS

INVENTOR.
CLEON F. FREY
BY
Ostrolenk & Faber
ATTORNEYS

INVENTOR.
CLEON F. FREY
BY
Ostrolenk & Faber
ATTORNEYS

INVENTOR.
CLEON F. FREY

BY

Ostrolenk & Faber

ATTORNEYS

INVENTOR.
CLEON F. FREY
BY
Ostrolenk & Faber
ATTORNEYS 2,922,881
Patented Jan. 26, 1960

2,922,881

MANUAL CONTROL HAVING ROTATABLE AND TILTABLE STEPPED CAM FOR TELEVISION TUNER

Cleon F. Frey, Pasadena, Calif., assignor to Standard Coil Products Co., Inc., Los Angeles, Calif., a corporation of Illinois Application April 18, 1955, Serial No. 501,868

8 Claims. (Cl. 250—40)

The present invention relates to combination frequency selectors, and more particularly, to a television tuner operable in the two widely separated bands of frequencies encompassing the channels of the present very high frequency (VHF) band, and the ultra high frequency (UHF) band.

The invention is particularly directed to the provision of a novel, efficient and inexpensive composite UHF-VHF tuner combination, essentially in a unitary construction. The basic components and circuit elements of the invention frequency selector are arranged in a novel manner, to be automatically operative in accordance with the frequency or channel in either spectrum, namely VHF or UHF, in which it is positioned. The frequency selector of the present invention incorporates a single channel selector shaft, by which the operator positions the tuner to any one of the twelve VHF channels, or any one of the seventy UHF channels, in a single 360° sweep of the tuning dial.

The provision of a unitary frequency selector shaft, for any of the eighty-two channels, renders the combination tuner of the invention simple and effective for laymen use, as only one set of knobs are required for both the VHF and UHF bands. A single fine tuning knob is arranged to be used in conjunction with the main tuning shaft, for fine adjustment purposes, as will be described. Thus, the tuner of the present invention is operable by a single pair of main and fine tuning shafts, generally arranged co-axially, whereby the operator utilizes a single pair of co-axially arranged knobs for tuning-in the receiver or television set, to any desired one of the channels over the widely separated frequency bands in the current eighty-two channel allocation.

The combination tuner of the present invention incorporates common mechanical and electrical components to a marked degree, and results in a frequency selector for operation in both the VHF and UHF bands, over all the eightly-two assigned channels, within a space and volume factor equivalent to existing tuners for solely only one band operation. In the present invention, the oscillator section is common to both the VHF and UHF bands; with the pre-selector and mixer stage of the VHF band being used essentially for requisite amplification of the UHF signals after their first heterodyning stage.

The UHF tuning section is arranged longitudinally of the tuner, in a manner to utilize the electrical portions of the VHF construction, from the common antenna input to the common oscillator section, and including the other stages therebetween. Such longitudinal and contiguous arrangement of the VHF and UHF tuning sections, permits the same length for the overall tuner as the VHF section alone requires. The cross-sectional area of such composite tuner is readily comparable to that of existing VHF-only tuners. The unitary design of the combination VHF and UHF tuners, with the composite tuning shafts and circuitry, results in a tuner of minimal expense for the overall; and a tuner unit that is rugged, efficient and light in weight.

An important feature of the present invention is the arrangement of the seventy UHF channels into discrete sub-bands. In a preferred embodiment, the seventy UHF channels are arranged in six channel sub-bands, wherein eleven six channel sub-bands and one four channel sub-band are arranged over twelve successive tuning positions. It has been found practical to arrange the UHF band into discrete sub-bands for discontinuous or discrete selection in operation. Since it is unlikely that, in any particular geographic location, the UHF channels will be more adjacent than of the order of six successive channel numbers, separation of the UHF channels into sub-bands of six channels each is practical and commercial.

Means are provided for readily positioning the invention combination selector to any of the pre-determined sub-band positions for the UHF channels, wherein a particular UHF channel within a selected sub-band is readily tuned-in. In one form of the invention, any of the six channels within a sub-band may, in turn, be pre-set, so that when the tuner is operated to the particular sub-band, the said pre-set channel is directly in tune for reception, as will be set forth in more detail hereinafter. A unitary fine tuning arrangement is available for all the VHF and UHF positions.

In the tuner of the preferred embodiment, the UHF band of seventy channels are arranged over 180° of the arc of rotation of the tuner, and in the exemplary embodiment within twelve discrete positions of 15° each. The VHF channels are also arranged in 15° steps about the remaining 180° arc of rotation, in twelve discrete channel steps. The resultant twenty-four position tuner accordingly affords a direct selection of any of the twelve VHF channels, namely Nos. 2 to 13; and any one of the seventy UHF channels, one (or more) within each of the twelve UHF sub-bands, as will be set forth. It is to be understood that different degrees of arc of rotation to subtend either the UHF or VHF bands, are within the compass of the present invention; and that the division of the UHF channels within predetermined sub-bands is a matter of design as to amounts, within the scope of the present invention.

Accordingly, an object of the present invention is to provide a novel frequency selector operable over two widely separate frequency bands of reception to select predetermined signals thereover.

Another object of the present invention is to provide a novel combination tuner operable in discrete steps throughout the assigned television channel allocation, including all eightly-two assigned channels.

Another object of the present invention is to provide a frequency selector for all assigned VHF and UHF channels, incorporating only a single tuning knob.

A further object of the present invention is to provide a novel frequency selector operable throughout the VHF and UHF signal bands having widely separate frequency spectra, and incorporating a single control shaft to select any of the channels throughout the said bands, and a single fine tuning arrangement for all the channels.

Still another object of the present invention is to provide a novel relatively inexpensive combination UHF-VHF frequency selector incorporating, to a marked degree, common mechanical and electrical elements for both bands of operation.

Still another object of the present invention is to provide a frequency selector incorporating a single vacuum tube section as the oscillator for both the UHF and VHF operation thereof.

Still another object of the present invention is to provide a combination television tuner for UHF and VHF operation over all eighty-two channels, with a size and cross-sectional area comparable to standard dimensions thereof of VHF-only tuners.

A still further object of the present invention is to provide a novel television tuner for receiving discretely channels over the whole VHF and UHF bands, wherein the tuner is operable over 360° of the control shaft, and wherein the circuitry within the tuner is automatically connected for either the UHF or VHF operation as required.

Still another object of the present invention is to provide a novel circuit arrangement for a combination UHF-VHF tuner utilizing the same vacuum tube circuitry for both bands, wherein the VHF amplifier and mixer stages are utilized as a two-stage amplifier for the UHF signals, after an initial heterodyning thereof.

The foregoing and other objects of the present invention will become more apparent in the following description of exemplary embodiments thereof, illustrated in the drawings, in which.

Figure 1:
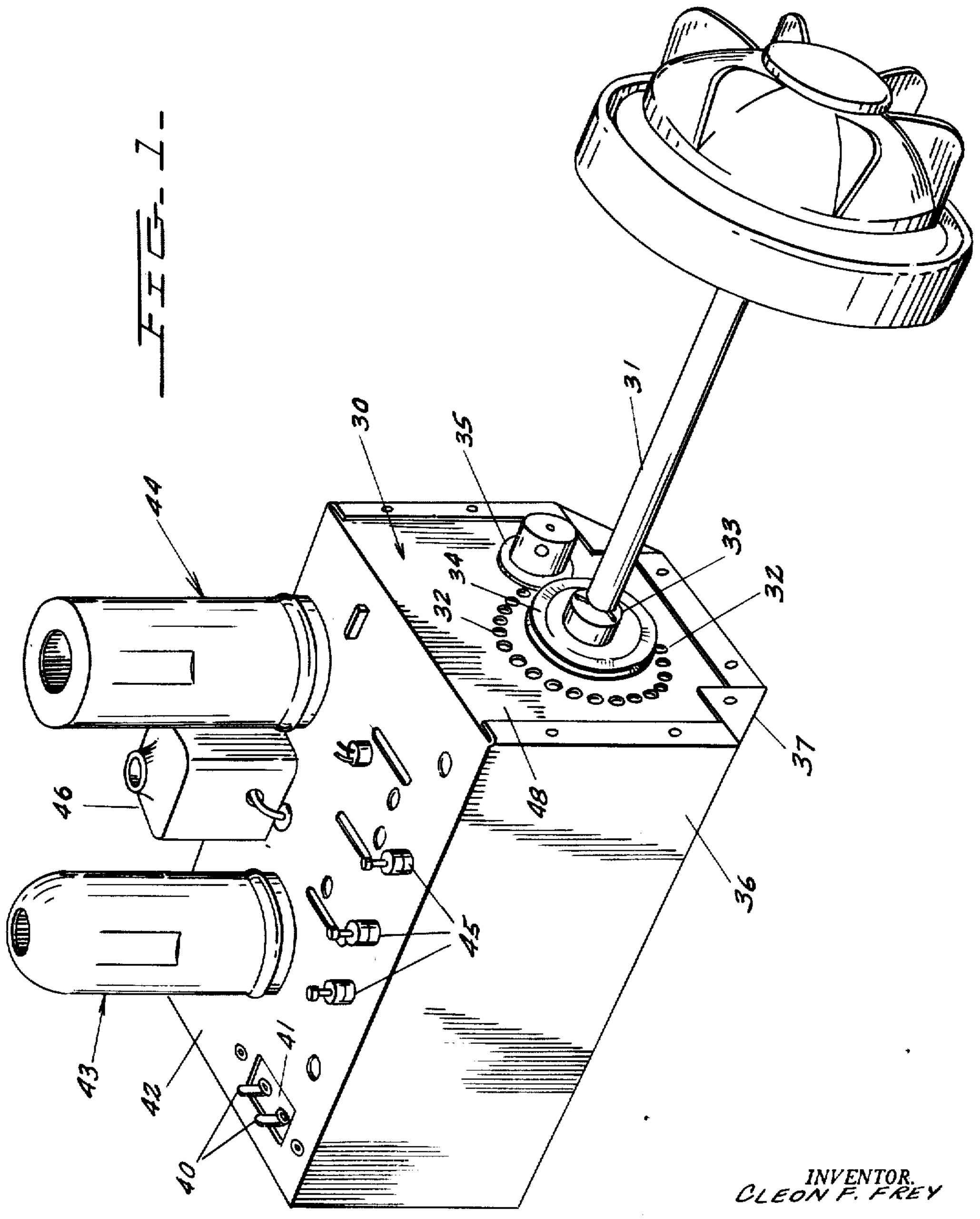
Figure 1 is a perspective view of the tuner embodiment of the invention, in elevation, completely assembled.

Figure 1 shows in perspective an exemplary embodiment of a combination UHF-VHF frequency selector or tuner, incorporating the principles and features of the present invention. The tuner 30 comprises a common selector or control shaft 31 for operating the tuner to any of the UHF or VHF channels. The openings 32 or holes in the tuner chassis face 48 represent the preferred twenty-four positions for the tuner operation. The openings 32 coact with a steel ball detent to be described, to position the movable mechanism within tuner 30 in predetermined angular stable positions, for corresponding discrete frequency selections of the television channels. It is to be understood that more or less than the illustrated twenty-four positions for the tuner are practical; the twenty-four positions being utilized for all of the twelve VHF channels, and for all of the UHF channels in groups of twelve sub-bands thereof, as will be set forth in greater detail hereinafter.

The unitary or common fine tuning arrangement for the tuner 30 is afforded through sleeve 33 coaxially about control shaft 31. A friction gear 34 secured to the inner end of sleeve 33 coacts with friction gear 35 mounted rotatably on the chassis of tuner 30. Fine tuning gear 35 operates the fine tuning mechanism within the tuner for accurately "tuning in" any of the VHF channels to a fine definition or clarity of reception; and also for correspondingly "tuning in" a desired UHF channel within any of the twelve UHF sub-bands. The details and operation of the fine tuning arrangement 35 will be more thoroughly set forth hereinafter. The electrical components and mechanism within the tuner 30 are enclosed by suitable shielding 36 on the sides thereof, and shielding 37 subtending the bottom of the tuner, to avoid radiation effects or interference from outside the tuner.

The antenna input to the tuner is provided at terminals 40, 40 mounted on insulating panel 41, secured to the top chassis surface 42 of tuner 30. As will be set forth, a common antenna input for both the UHF and VHF antennae are used for tuner 30. An RF amplifier stage, comprising a cascode circuit such as described in detail in Serial No. 211,959, filed February 20, 1951 comprises an electron tube 43, is mounted within a shield on chassis top 42. Amplifier 43 may be a cascode electron tube, such as the type 6BQ7A, or a suitable pentode amplifier, such as a 6BC5 tube. The cascode, or if preferred pentode stage, 43 is used as an RF amplifier for VHF operation; and is connected as an amplifier stage for UHF signals after heterodyning.

The second electron tube of tuner 30 is at 44, also enclosed within a metallic shield. Tube 44 is used as a combination oscillator mixer in VHF operation; and is a dual tube, as a double triode, e.g. 6BQ7A. Tube 44 serves as a novel common oscillator stage for both UHF and VHF operation as will be set forth; and the mixer portion thereof for VHF operation, is used as an amplifier stage for the heterodyned UHF signals after their amplification by stage 43, all as will be set forth in detail hereinafter. Trimmer elements 45 extend from the top 42 of the chassis, for adjustments in the VHF circuitry of the tuner after assembly, as is practiced in the art.

Figure 2:
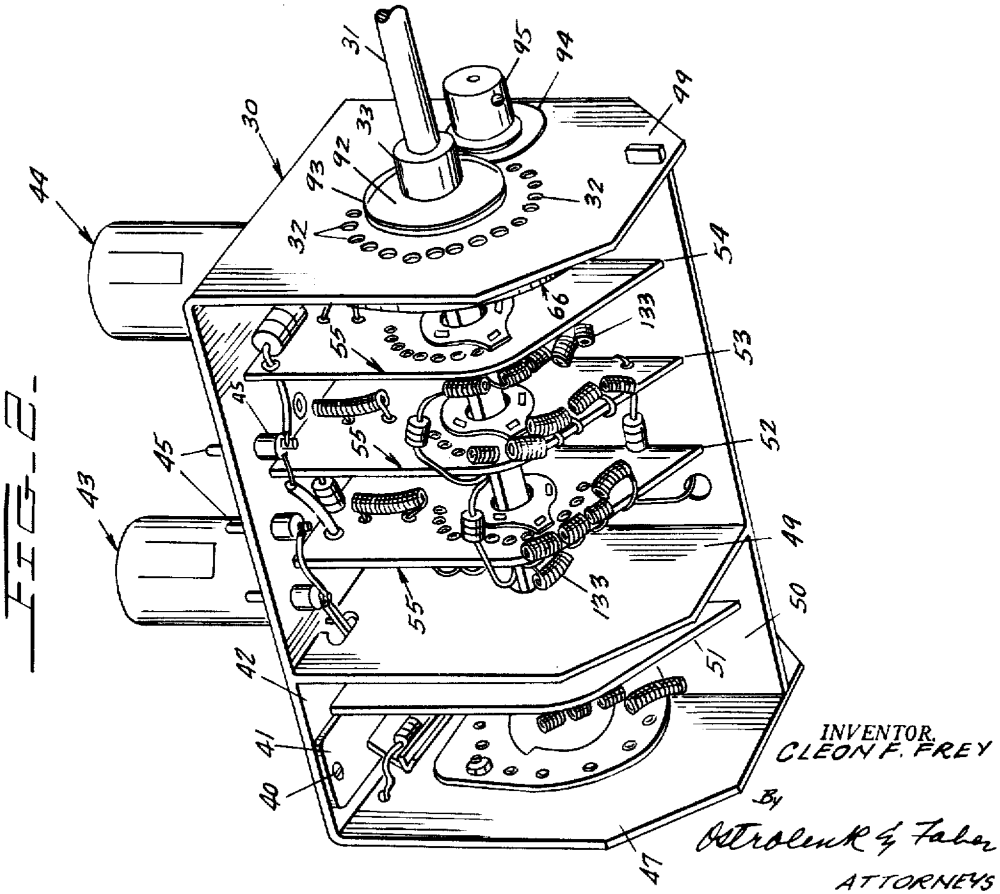
Figure 2 is a perspective view of the tuner of Figure 1, in elevation, with the shielding thereof removed, exposing the VHF section therein.

Figure 2 is an elevational view of the tuner of Figure 1, with the side and bottom shielding 36 and 37 removed, exposing the VHF internal electrical and mechanical structure to view. The rear end of the tuner 30, namely side 47, serves as a mounting for the terminal end of control shaft 31; and as an end shielding plate for the tuner.

The front end plate 48 also serves to shield the tuner 30, and established a front bearing surface for control shaft 31, in usual tuner practice. The internal shielding plate 49, parallel to plates 47 and 48, compartmentalize the VHF section. The RF preselector wafer element 51 and its circuitry is compartmented between the shield panels 47 and 49. The wafers 52, 53, 54 of the RF mixer-oscillator section are between the plates 48 and 49.

Figure 7:
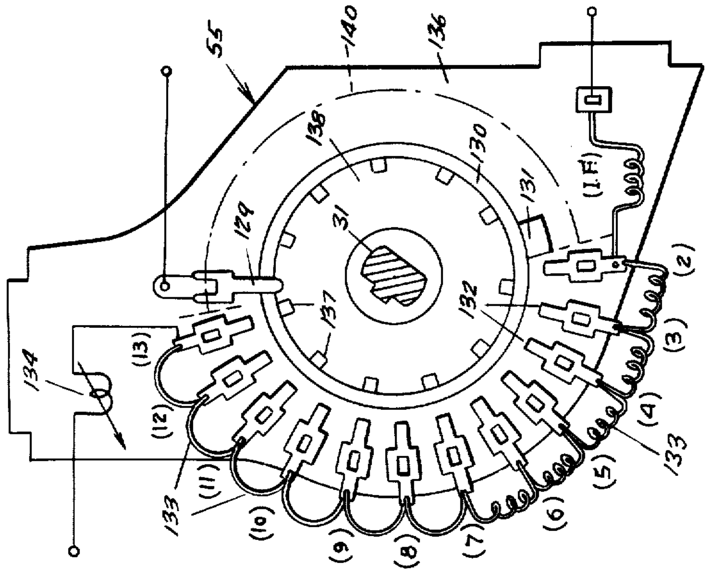
Figure 7 is an end view of a VHF circuit wafer inductance.

Circuit wafers 51 to 54 are variable inductors and correspond to the composite wafer 55 shown in Figure 7, and described and detailed therewith. The wafers are used for selectively tuning-in the twelve VHF channels. The circuit wafers, corresponding to 55 (Figure 7), contain elemental discrete inductances at successive positions for twelve channels, to afford proper circuit parameters to the oscillator section associated with wafer 54; and essentially wafers 51 to 54, with the circuit elements between the front and rear shields 48, 47 and the interior shield 49 afford a VHF tunable discrete selector, providing selectively any of the twelve VHF channels. In the exemplary embodiment, such VHF selection occurs over a 180° swing of the control shaft 31.

It is to be understood, that the invention herein is applicable to other means for providing the twelve VHF channels by a common control shaft 31; and may be obtained over a greater or smaller arc than the aforesaid 180°. For example, the VHF channels may be provided by the use of discrete panels arranged about a circumference of a turret tuner, such as shown and illustrated in Patent No. 2,496,183 assigned to the same assignee as this case. In the turret tuner of the patent, the VHF sections subtend 360°; whereas in the tuner herein, they subtend over 180° or more or less. Also, a continuous condenser or inductance tuner unit for providing the VHF is within the purview of the invention. The antenna terminal block 41 and the antenna connection terminals 40, 40 are seen situated in the top panel 42 above the RF preselector section between panels 47, 49, and direct connection therewith is provided.

Figure 3:
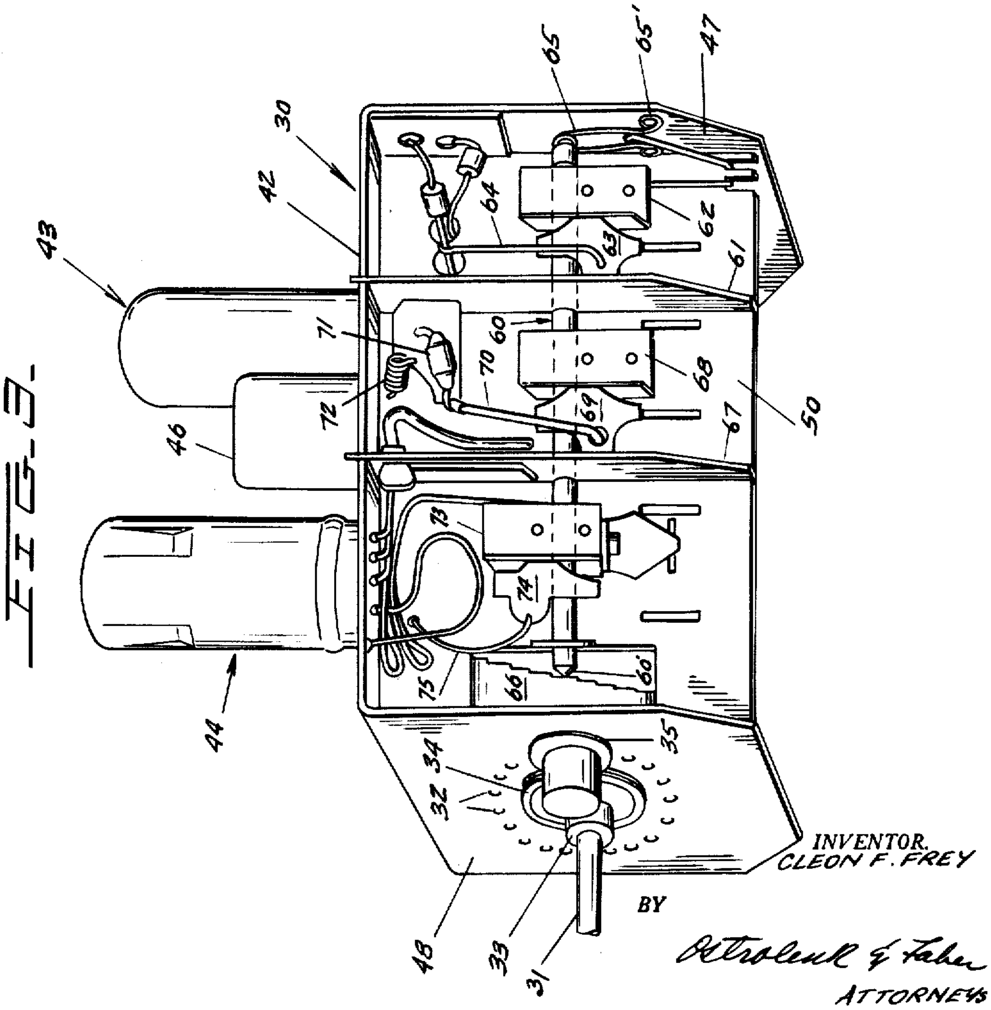
Figure 3 is a perspective illustration of the tuner of Figures 1 and 2, in elevation, and with the shielding thereof removed, showing the opposite side to that corresponding to that of Figure 2, with the UHF components in view.

Referring now to Figure 3, the perspective view of the combination tuner 30 is from the rear with respect to that of Figures 1 and 2. In Figure 3 is seen the UHF electrical and mechanical tuning components, physically located between end plates 47, 48 and a centrally located longitudinal shield 50. It is to be noted that the UHF section of the tuner is axially arranged along the tuner and that its tuning control shaft or rod 60 is parallel to control shaft 31. Rod 60 is displaced from shaft 31, and is located centrally of the UHF compartment 47, 48, 50. The VHF compartment in the tuner is also axially arranged, parallel to the UHF compartment, with the control shaft 31 extending centrally therethrough, as seen in Figure 2. The relationship of the UHF and VHF compartments and controls is more particularly apparent in Figure 4.

The antenna input preselector stage of the UHF circuit is located between end shield 47 and an internal metallic shield 61 parallel thereto. UHF input tuning circuit comprises a rotor section 62 secured suitably to rod 60 and a coacting stator 63 from which circuit lead 64 extends. A suitable spring 65 connects to the end of control rod 60 and end plate 47, affording a mechanical bias to the rod, towards the left in Figure 3, wherein the front end 60′ of rod 60 is maintained in pressure against the stepped control cam 66. Cam 66 is secured with control shaft 31 for the control purposes, to be detailed hereinafter. At this point it is sufficient to state that the steps or cammed segments of cam 66, coact with the front end 60′ of control rod 60, moving in a longitudinal direction, and by predetermined amounts, wherein the setting or relationship or the rotor and stator plates of the UHF condensers (such as 62, 63) are predetermined for frequency tuning of the UHF signals.

A further UHF compartment is defined by shield plate 61 and parallel plate 67. The compartment 61, 67 and subtended by the axial shield 50, there is a further UHF tuning condenser comprising rotor 68 secured to rod 60 and stator 69. UHF condenser 68, 69 in the exemplary embodiment is part of a further UHF selecting and amplifying circuit to which lead 70 extends and connects to one end of a mixer crystal 71 mounted in the compartment. Preferred circuit connections for the UHF sections, and their relationship, is set forth in detail in connection with Figure 6 hereinafter. The purpose of crystal 71 is to heterodyne the UHF signal output from condenser 68, 69 together with the UHF oscillator frequency injected to this circuit from the UHF oscillator compartment 67, 48. A high frequency choke coil 72 is also shown in the illustration.

The UHF oscillator section is mounted in the shielded compartment comprising front plate 48 and intermediate shield 67, together with the axial central shield 50. It is to be understood that an outer shielding for the UHF compartment, is used as denoted at 36, 37 in Figure 1. The rotor plate 73 of the UHF oscillator condenser is secured to rod 60, and coacts with the stator plates 74 thereof. Lead 75 connects from stator plates 74 to the electron vacuum tube 44, containing the triode oscillator 44″ seen in Figure 6. Wire leads 76 are seen in Figure 3 as part of the UHF oscillator circuit, and its connection with the terminal section of the tube 44.

Figure 4:
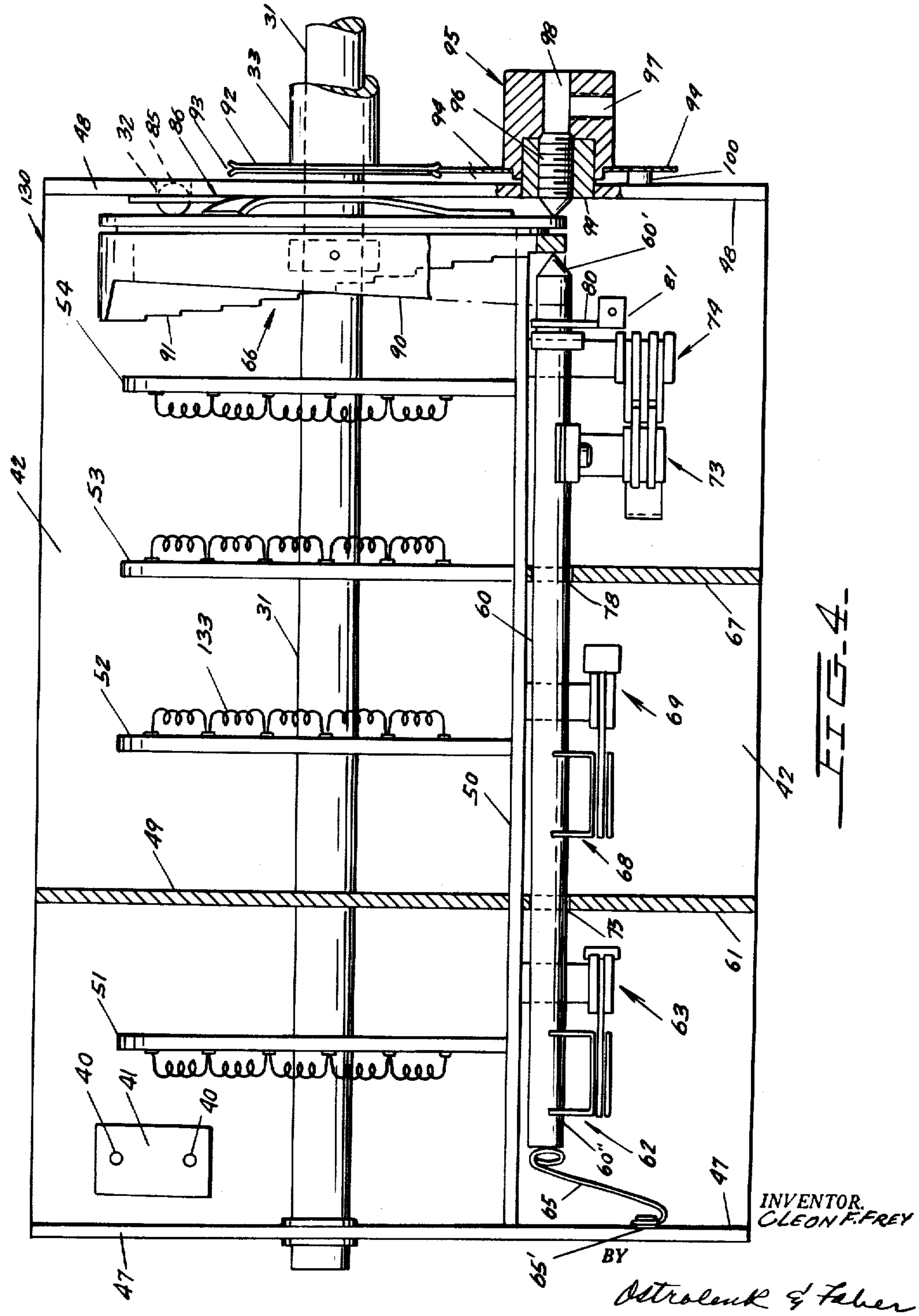
Figure 4 is a side elevational view as viewed from the bottom, of an exemplary embodiment of the invention tuner, showing the interior components of the VHF and UHF sections, and the mechanical control mechanism thereof.

Figure 4 is a bottom view of tuner 30 with the external shielding removed, and illustrating generally the structural arrangement of the UHF and VHF tuning elements. The main control shaft 31 extends between the front plate of tuner 30, namely plate 48, and rear plate 47, as already set forth. Electrical components, such as resistors, condensers, and connection leads have been omitted from Figure 4 for clarity of illustration; and to more definitely set forth the mechanical arrangements thereof. Longitudinal shield plate 50 is displaced off from the axial center of shaft 31. In the illustrated embodiment there is provided about two-thirds of the transverse tuner area for the VHF tuning sections; and one-third of the area for UHF sections. It has been found that the overall cross-sectional area of tuner 30, either in the longitudinal or transverse direction, is of the same order of size as conventional tuners for just VHF.

The combination all-channel tuner of the invention is readily incorporated in television receivers standardized for a VHF tuner; with the single control shaft and single fine tuning shaft for the tuner 30 operating the same simple manner as a VHF-only tuner. The input tunable wafer 51 is seen located between the rear shield 47 and internal shield 49, properly isolating the VHF antenna input preselector circuit. The cascode plate circuit wafer 52 is located between shield 49 and front shield 48, together with the mixer grid wafer 53, and oscillator wafer 54. Suitable mutual induction exists between wafers 52 and 53, as well as with oscillator wafer section 54, all shielded within the compartments 48, 49, 50 and the external shielding for the tuner 30.

Operation of the wafers 51 to 54 by shaft 31 and the associated circuitry therewith is understood by those skilled in the art, and is described in more detail in connection with Figures 6 and 7 hereinafter. The three UHF shielded compartments described in connection with Figure 3, are seen from the bottom view in Figure 4. The UHF control shaft or rod 60 is arranged in the axial direction of tuner 30, parallel to the tuning control shaft 31. The axial displacement of rod 60 controls the coaction of the UHF condensers 62, 63, 68, 69, 73 and 74. Rod 60 is slideably mounted through suitable openings 77 and 78 in internal UHF shields 61 and 67, respectively. It is also supported by leaf spring 80 extending from mounting post 81.

Figure 18:
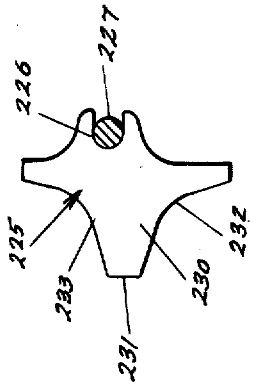
Figure 18 is a plan view of a typical stator plate for a UHF condenser herein.
Figure 19:
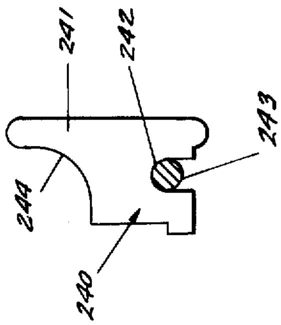
Figure 19 is a plan view of a typical rotor plate of a UHF condenser herein.

A spring 65 connects to the rear end 60″ of rod 60 and is secured in turn to rear tuner plate 47, at 65′. Spring 65 accordingly mechanically presses the front tip 60′ of rod 60 continuously against surface of cam 66, The longitudinally movable rotor sections of the UHF condenser assemblies, namely rotors 62, 68 and 73 are each secured in a suitable manner to control rod 60, in order to be axially displaced in unison or ganged relationship under the control of cam 66. The stator assemblies of the condensers, namely stators 63, 69 and 74 are secured by suitable structural posts to chassis shield 50. Details of an exemplary embodiment of the rotor and stator plates, and their function, will be described hereinafter, and are illustrated in Figures 18 and 19.

Cam 66 is suitably secured to control shaft 31, and is rotated over 360° thereby shaft 31. A steel ball 85 carried in a recess of a spring spider 86, in turn secured to the rear of cam 66, coacts with twenty-four equally spaced holes 32 on front plate 48. Such arrangement with steel ball 85 serves as a detent, to position control shaft 31 in accurate predetermined angular relationships in tuner 30, along the twenty-four positions defined by the openings 32 being spaced 15° apart. The cammed surface of cam 66, has a linear section 90 for the VHF and stepped sections 91 for the UHF, as seen in Figure 4, and the purposes thereof will be set forth hereinafter. Details of an exemplary embodiment of such cammed surface are described and illustrated in connection with Figures 9 to 12 hereinafter. The stepped portions 91 of cam 66 coacts with the front tip 60' of rod 60, to position the rod in an axial manner and in a predetermined relationship by steps 91.

Axial displacement of rod 60 controls, in turn, the positions of the rotors 62, 68 and 73 of the UHF tuning sections, to operate the UHF tuning as will be set forth. As described hereinabove, UHF condenser 73, 74 is part of the UHF oscillator circuit. The UHF oscillator is located opposite the VHF oscillator in tuner 30, and directly beneath the electron tube 44 common to both oscillators whereby the leads from UHF section 73, 74 are extremely short to the terminals of the oscillator tube. The condenser section 62, 63 and 68, 69 comprise the UHF preselector circuits as described. The tuning of the aforesaid three condenser sections provides selectivity of the tuned-in UHF channel, amplification thereof, and heterodyning with the proper injected oscillator signal at mixer crystal 71, as seen in Figures 3 and 6.

In an exemplary embodiment of the invention, the displacement between the UHF steps 91 in the axial direction is .031 inch. With suitable physical design of the UHF condensers, such displacement of all three together, by rod 60 under the actuation of successive steps 91, provides the UHF sub-bands already referred to, encompassing six UHF channels each. It is preferred to make axial displacements of the cam steps 91 in equal diameters, and suitably proportion the physical design of the coacting rotor and stator plates of the UHF condensers to afford the desired frequencies to be subtended at the indicated sub-bands. A reverse procedure is of course, feasible. Suitable shapes of exemplary stator and rotor plates for this purpose are shown and described in connection with Figures 18 and 19. It will thus be noted that a total displacement for the twelve sub-bands in the UHF spectrum, to subtend the seventy assigned channels therein, will result in a total displacement of rod 60 and the corresponding rotor plates 62, 68 and 73 by an amount of 0.341 inch with the illustrative parameters. Coaction of UHF rod 60 with cam 66, and its mounting described above, should be in a stable mechanical relationship to avoid microphonics and signal disturbance due to vibrations of the tuner in operation, as will be understood by those skilled in the art.

Figure 6:
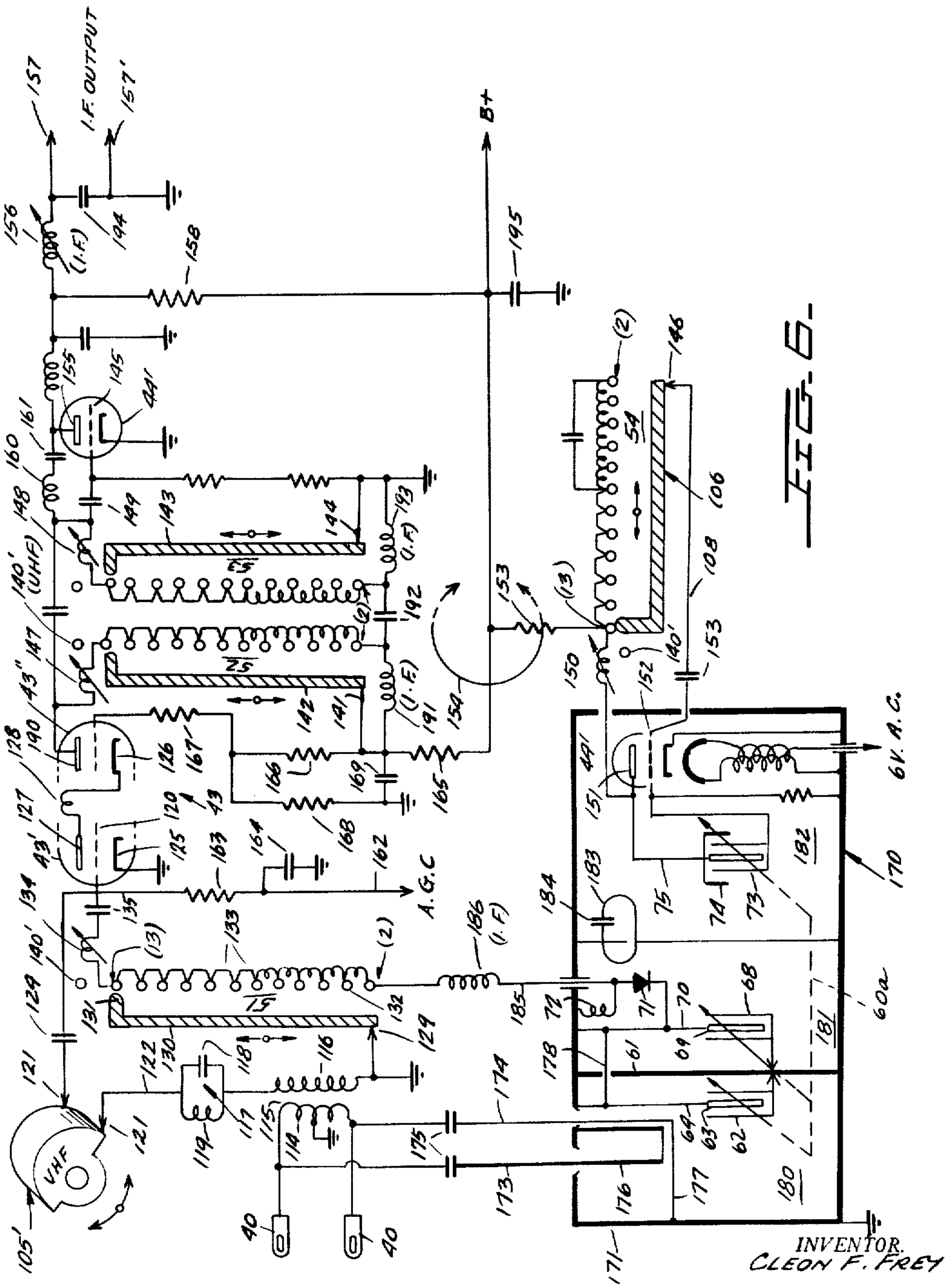
Figure 6 is a schematic circuit arrangement of the electrical section of an exemplary tuner.

As will be set forth, the UHF oscillator condenser 73, 74 remains in circuit with the oscillator 44'' tube while the VHF oscillator is in circuit for VHF channel reception (see Figure 6). Condenser 73, 74 during VHF reception, serves as a fine tuning condenser for the VHF channels. Towards this end, a suitable cammed surface 90 on control cam 66 is provided to displace the rotor 73 of this condenser and to suitable positions in correspondence with twelve VHF channel frequencies. The fine tuning displacements effected by sleeve 33 serves as fine tuning for the VHF channels. The fine tuning sleeve 33 also displaces rod 60, together with the corresponding condenser rotors, over a displacement corresponding to the order of the rise in each step 91, to select any desired UHF channel in each of the twelve sub-bands and to accurately tune the selected UHF channel in the manner of a fine tuning arrangement.

Fine tuning shaft or sleeve 33 has secured, at the tuner end, a circular disc 92 with a flanged circumference 93 having a conical groove. A circular disc 94 coacting with flange 93 of disc 92 serves as a pair of friction pulleys or gearing whereby rotation of fine tuning sleeve 33 in turn rotates the fine tuning disc 94. To disc 94 is secured hub 95 within which is fastened a fine tuning control pin 96 threaded at its left side in Figure 4. A set screw 97 secures the unthreaded end 98 of control pin 96 to hub 95. Details of this arrangement, and an enlarged cross-sectional view, are described in connection with Figures 15 to 17. A post 99 is fastened to an opening in front tuner plate 48, opposite the operable circumferential section of the cam 66, in line with the axis of the condenser rod 60. Post 99 is internally threaded to coact with the threaded control pin 96, and rotatably supports hub 95.

Rotation of disc 94 frictionally by disc 92, through fine tuning sleeve 33, in turn causes threaded pin 96 to be axially displaced with the fixed post 99. The control pin 96 abuts the rear surface of cam 66, as seen in Figure 4, and its axial displacement causes a corresponding tilting or displacement of cam 66 about its spider spring 86, in a manner to be described hereinafter; and in turn, causes an identical axial displacement of the condenser control shaft 60. It has been found that a total displacement for control pin 96 of the order of 0.040 inch is sufficient for fine tuning control for all the UHF and VHF channels in this tuner embodiment. Such displacement of 0.040 inch is somewhat more than the total displacement between the UHF steps 91 subtending the sub-bands in the UHF region, having six UHF channels of six megacycles each. It is understood that different displacements between the UHF steps 91, for different numbers of channels and/or sub-bands, will result in a correspondingly greater or lesser overall swing needed for the control pin 96.

It is desirable to incorporate a stop pin 100 on disc 94 to coact with an abutment on chassis plate 48, in order to limit the overall displacement of the control pin 96 to only the aforesaid 0.040 inch and thus prevent additional displacement of tiltable cam 66, or of the control rod 60. Furthermore, by controlling the rotation of the disc 94 and hub 95 to only one revolution, that is within a 360° swing, the phase and position of the shaft 60 is known and controlled for a maximum of 0.040 inch by fine tuning shaft 33. Similarly, the same 0.040 inch displacement of UHF oscillator condensers 73, 74 when functioning in VHF reception, is sufficient to afford ample fine tuning for any of the twelve VHF channels in the exemplary embodiment.

Figures 5, 15, 16, 17:
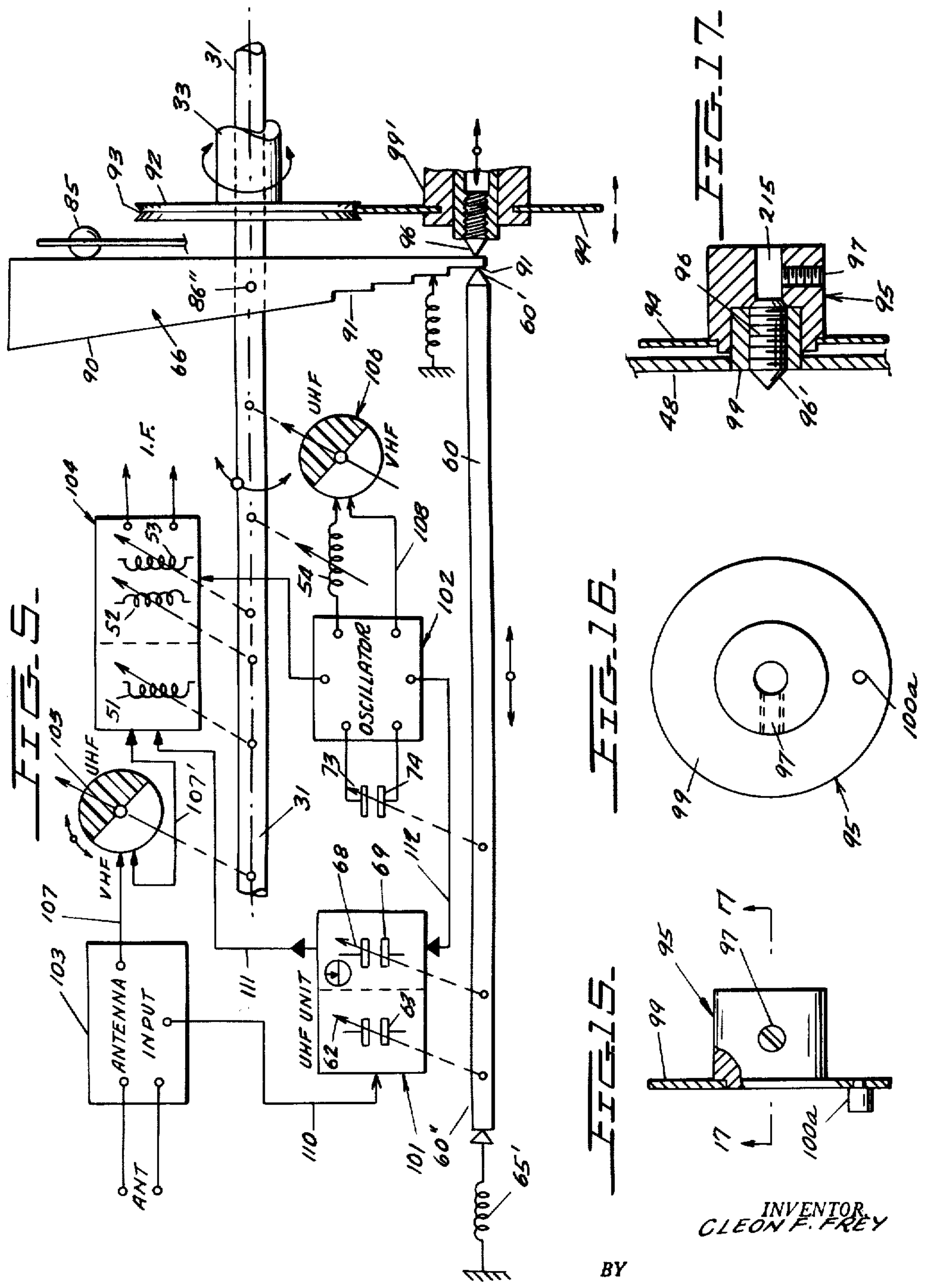
Figure 5 is a block diagram of the invention combination UHF-VHF tuner.
Figure 15 is an elevational view of the fine tuning mechanism of the embodiment tuner, with portions thereof broken away.
Figure 16 is an end view in elevation, of the fine tuning mechanism of Figure 15.
Figure 17 is a cross-sectional view through the fine tuning mechanism, taken along the line 17—17 of Figure 15.

Figure 5 is a block diagram schematically showing the electrical and mechanical aspects in essential combination for the invention system. In broad terms, the present invention provides a unitary combination VHF and UHF tuner, whereby the operator directly selects any one of the eighty-two assigned channels in the composite UHF and VHF frequency spectra, by simply rotating the main tuning control shaft 31; and by correspondingly rotating the fine tuning sleeve 33 to: in the case of VHF channels pinpoint the optimum frequency position for maximum clarity of reception: and in the case of the UHF channels, select the proper UHF channel within the predetermined UHF sub-bands, and in turn, fine tune the selected UHF channel to maximum clarity.

In the exemplary embodiment, a detent arrangement, employing a steel ball 85 positions the main tuning shaft 31 to a predetermined number of angular positions, e.g. twenty-four; correspondingly, the fine tuning sleeve 33 axially displaces the threaded control pin 96 by a predetermined amount, e.g. 0.040 inch within the stationary threaded post 99'. As described in connection with Figure 4, the condenser actuating cam surface 90 is angularly displaced by control pin 96 across the schematically indicated pivotal point 86'' provided by the spider spring 86 (not shown in full). The spring 86' of Figure 5 schematically represents spider spring 86 in the action of the biasing of the cam 66 against the control pin 96 and across its effective pivot 86''.

The predetermined axial positioning of the condenser control rod 60 is afforded by the combination of the angularly positioned steps 91 of cam 66, or its VHF control surface 90, together with the angular displacement by the control pin 96 of cam 66. The composite position of rod 60 impressed upon its front tip 60' by the cam 66 and control pin 96, in turn controls the position of the tunable elements in the UHF unit 101 and the oscillator unit 102. The spring indicated at 65' biases rod 60 against the cam surfaces 90, 91 of cam 66.

The mechanical system acting on the rotor plates 62, 68 and 73 of the condensers as shown in the schematic Figure 5, merely for diagrammatic reasons, and corresponding to that already described and shown in Figure 4. It is to be understood however that for the broad purposes of the invention herein, equivalent and different types of mechanical displacements and control actions on the variable impedance elements in UHF unit 101 and oscillator unit 102 may be constructed, all within the purview of the invention. In place of a control rod 60 displaced axially and linearly, there may be used a rotary displacement on control elements of impedances corresponding to 62, 63 and 68, 69 and 73, 74. Also, in place of the condensers herein for the units 101, 102 other impedances such as inductances may be substituted.

Generically, the invention provides for frequency selection in a UHF unit 101 and oscillator unit 102 by mechanical displacement, either rotary or linearly, or otherwise, afforded from the front of the tuning unit by the operator, through either a rotatable sleeve as 33, or by other suitable arrangements. The use of the rod 60 and cam 66 together with the control pin 96, and associated components, is merely for exemplary purposes herein. In a similar manner, the operation of the control shaft 31 in an angular relationship may be otherwise arranged, such as a linear displacement, in the broad aspects of the invention.

Basically, the tuner of the invention provides: an antenna input unit 103, common to both the UHF and VHF bands; a VHF unit 104; the UHF unit 101; and an oscillator 102, common for both the UHF and VHF unit; and common main tuning 31 and fine tuning 33 unitary arrangements. Figure 5 is a block diagram intended to show this relationship. VHF unit 104, corresponding to that described in connection with the previous figures, embodies, for exemplary purposes, variable inductor elements 51, 52 and 53, angularly displaceable by control shaft 31 to any one of its twelve VHF channel positions. Control shaft 31 also controls oscillator inductor unit 54 to any of its twelve corresponding VHF channel positions. Details of exemplary circuital arrangements for units 101 through 104 of Figure 5 are shown and described in connection with Figure 6.

It is again stated, however, that the generic invention herein is independent of specific elements for units 101 through 104 and their associated components described in the exemplary embodiments, for the purposes and results accomplished. The VHF unit 104, for example, may embody discrete inductances for the twelve channels along switch wafers 51, 52, 53; or be a contiguous inductor or capacitor element instead, as will be understood by those skilled in the art. Likewise, the oscillator inductor wafer 54 may have an equivalent substitute without departing from the spirit and scope of the invention.

In block diagram Figure 5, it will be noted that angular switches 105 and 106 are provided to disconnect certain circuit portions when the tuner is positioned for UHF reception. The switches 105, 106 are shown circular and 180° for either frequency spectrum. The switches 105, 106 are conductive along their VHF indicated portion, and are angularly displaced by control shaft 31. During the operation of any of the twelve VHF channels by the tuner, the conductive VHF portions of switches 105, 106 maintain circuit continuity between the output lead 107 of antenna unit 103 and its associated continuing lead 107' through 105 to the input of the VHF unit 104; and the connection of the oscillator inductor wafer 54 to the oscillator unit 102 through lead 108 across switch 106.

When control shaft 31 is moved to the VHF reception angular position, the insulation portions of the switches 105, 106 are in coaction with the contact elements thereof, to open the circuit of antenna output 107, 107', and open the VHF inductor 54 from oscillator 102. Thus, during all the UHF reception positions by control shaft 31, in the illustrated embodiment subtending 180°, the antenna input unit 103 remains disconnected from the VHF unit 104; and the VHF oscillator inductor 54 remains disconnected from the oscillator circuit of unit 102. In accordance with the invention, the antenna input 103 automatically shifts the signals from the UHF antenna (not shown) to the input of the UHF unit 101 through the continuously connected lead 110 thereto. As the remainder of the UHF circuit, embodying unit 101 and the UHF portion of oscillator 102, remains interconnected, the heterodyned output of the UHF unit 101 is fed to the VHF unit 105 through lead 111. With the system in UHF reception condition, the oscillator 102 has its frequency output determined by the setting of the condenser 73, 74 and has the VHF frequency determining element, namely inductor 54, disconnected.

The UHF unit 101 has the UHF oscillator frequency impressed thereon, schematically shown by lead 112. The UHF channel preselection of the UHF band impressed on unit 101 through lead 110, is selectively arranged by positioning of the frequency determining elements therein through rod 60, and thereupon heterodyned with the UHF oscillator frequency, at the schematically indicated mixer 71. The output of the UHF unit 101 is at a frequency on the order of operation of the VHF unit 104. In one embodiment, such frequency output of unit 101 through lead 111 was 43.5 megacycles, corresponding to a tuning frequency below that of channel 2, setting of the inductors within the VHF unit 104. VHF unit is arranged to amplify the heterodyne output of the UHF unit 101, and in turn feed it to the intermediate frequency (IF) of the television receiver. The 43.5 megacycle frequency selected corresponds to a preferred intermediate frequency (IF) of the television receiver. It is to be understood that another frequency may be chosen, without departing from the scope of the invention herein.

Summarizing, the invention system as schematically illustrated in Figure 5, broadly comprises a single antenna input for both the UHF and VHF signal 103; separate VHF and UHF preselector-mixer units 101, 104; and a single oscillator circuit common to both the VHF and UHF units, 102; together with a single operating mechanism that controls the system in a unitary manner to select any one of the channels within both the UHF and VHF ranges, (broadly speaking, within any of two widely separated communication bands); and a single fine tuning mechanism for controlling both the UHF and VHF signals. A frequency selector is accordingly thus provided having a simple two-knob control to provide tuning-in for any one of the UHF or VHF channels, and fine tuning thereof; with the use of common antenna and oscillator components wherein the VHF unit for preselection and mixing the VHF signals is alternatively used to amplify the UHF signals, (heterodyned at 101 to the intermediate frequency) and provide essential amplification of the weaker heterodyned UHF signals is an important feature of the present invention.

Reference is made to Figure 6 for a schematic circuit diagram of an exemplary embodiment of the composite UHF-VHF tuner, illustrated in the previously described figures, and block diagrammed in Figure 5. The exemplary embodiment of the unitary combined UHF-VHF tuner has a common antenna input at terminals 40, 40 to which the transmission line to suitable antennae for the system connects. Such line has e.g. 300 ohm impedance. The antenna is connected to the primary winding 114 of antenna transformer 115, with the center tap thereof grounded for a balanced antenna input. The secondary winding 116 of the antenna transformer is unbalanced for VHF reception, with one terminal grounded and the other connected through an intermediate frequency (IF) trap 117 to the input grid electrode 120 of amplifier stage 43. The IF trap 117 comprises condenser 118 and inductance 119 with suitable parameters whereby the intermediate frequency (IF) from the remainder of the circuit is absorbed and otherwise prevented from passing to the secondary winding 116 and back through to the primary 114 of the antenna transformer 115; thus minimizing IF radiation through the antenna connected thereto.

The intermediate frequency, in the exemplary embodiment, is 43.5 megacycles, to which the trap 117 is resonant. The VHF signals from the antenna secondary winding 116 are connected through the 180° switch 105', in turn controlled by the angular position of the tuning control shaft 31. The VHF portion of cam switch 105' is conductive to interconnect contacts 121, 121 between the leads 122 and 123. A suitable coupling condenser 124 extends from lead 123 to the input grid 120 of amplifier stage 43. During the full orientation of control shaft 31 in its reception of the twelve VHF channels, switch 105' affords continuous electrical contact between leads 122 and 123, thereby directly connecting the VHF antenna signals from secondary winding 116 to the grid 120. The amplifier stage 43 is shown in Figure 6 as a cascode amplifier, comprising triode section 43' (the cathode 125 of which is grounded), and a successive cascode section 43'' (the cathode 126 of which is connected to the output plate electrode 127 of the first cascode triode 43'), through a suitable coupling inductor 128, in the usual circuit manner.

It is to be understood that the cascode amplifier circuit at 43 is merely illustrative, and may be a suitable pentode or other type of amplifier stage. The noise factor of a cascode amplifier 43 is more suitable than that of a pentode amplifier. The input circuit of first cascode stage 43', comprising grid electrode 120 and cathode 125, has a tuned inductor wafer section 51 normally connected to grid 120 and to ground, through contactor 129 connecting to the switch-arm 130. The inductance wafer indicated at 51 corresponds physically in one form to that shown at 55 in Figure 7, and to be described in more detail. At this juncture, it is to be noted that such tuning inductors as 51 have been used in the prior art to select, in discrete steps, channels in the VHF band of a frequency selector, and is used herein for exemplary purposes. Extending contactor plate 131 on arm 130 coacts successively with contact jaws 132, 132. Contact plate 131 slides between closed jaws at each position 132 to connect serially to intermediate and extreme portions of inductance coils 133, 133 in series connection between the contact jaws 132, 132.

With contactor plate 131 connected in the illustrated position (Figure 6), with the uppermost contactor jaws 132 (channel 13 position), output antenna winding 116 by-passes all the serial coils 133, 133, and through its contactor 129 connects to arm 130. Contactor plate 131 of arm 130 directly connects to input control grid 120 of cascode section 43' through terminal inductor 134 and coupling condenser 135. Terminal inductor 134 is adjustable, and corresponds to the inductance required in the input circuit herein, to resonate selectively to the frequency band of channel 13, namely 210 to 216 megacycles.

Reference is made to Figure 7 showing an illustrative embodiment of the wafer corresponding to 51, namely wafer 55. Wafer 55 has a section 136 of composition material upon which contactor jaws 132, 132 are individually mounted in a circular arrangement. In this exemplary embodiment, the twelve contactor jaw assemblies 132, 132 are spaced 15° apart, and correspond with each of the twelve channels in the VHF band extending from assigned channel 2 to channel 13, as indicated on the figure. Contactor 129 is in continuous contact with the arm 130 which is circular in shape. Arm 130 is connected to a central circular composition rotor 138 by flaps 137. The central portion of rotor 138 is secured to the VHF control shaft 31.

In the embodiment of Figure 7, the VHF channels subtend 180° of the wafer 55. The remaining 180° of wafer 55, corresponding to the arc of dashed line 140, is the UHF section. In UHF section 140, contactor plate 131 does not coact with any jaw connector 132, leaving the serial coils 133, 133 disconnected from contactor arm 130. In Figure 6, such VHF disconnected position of wafer 55 is indicated by terminal 140' at each of the wafers 51, 52, 53, and 54 in position beyond channel 13 and marked (U). Such disconnection of contactor arm 130 from VHF coils 133, 133 throughout the UHF swing of control shaft 31, provides one portion of the switching arrangement in the transition of the tuner system from VHF to UHF operation and vice versa.

In the case of the wafers 51 to 54 such disconnection to the 140' positions in Figure 6, disconnects the wafer coils 133, 133 entirely: (*a*) at the antenna preselector section 51, across contactor 129 and contact arm 130; (*b*) at the output circuit of cascode amplifier 43, at wafer 52, across contactor 141 and its associated contactor arm 142; (*c*) disconnects mixer wafer 53 from the input grid 145 of mixer triode stage 44' by opening switch arm 143 at position 140' thereof, wherein the connection thereto 144 is opened to the coils of wafer 53; and (*d*) VHF oscillator inductance wafer 54 is disconnected from triode oscillator section 44'' by the contactor arm 106' thereof, being moved into its position 140', and the associated contactor 146 normally connected to lead 108 is opened and left unconnected to the serial coils of wafer 54.

It is to be understood that the wafers 52, 53 and 54 herein described, are similar to the embodiment shown in Figure 7, as is wafer 51. The terminal inductance for wafer 52, corresponding to the inductance required for channel 13 at the output of cascode amplifier stage 43', namely, variable inductor 147, corresponds to the terminal inductance 134 of wafer 51. Similarly, terminal inductance 148 is connected between the end of wafer 53 and the control grid 145 of mixer 44', through a coupling condenser 149. A terminal inductance 150 is provided between the channel 13 position of wafer 54, for the VHF oscillator, and the plate electrode 151 of oscillator triode 44''. Inductor 150 is adjusted to determine the frequency of oscillation of triode 44'' required for channel 13 operation when contactor arm 106' is in the indicated channel 13 position. The control arm 106' for wafer 54 is connected to the control grid 152 of oscillator 44'' through a suitable coupling condenser 152. The plate voltage supply for plate electrode 151 is provided by a suitable B+ source through dropping resistor 153, in the well known manner.

The inductance of wafer 52 in the plate circuit of amplifier 43 for any selected VHF channel is resonant in such VHF channel frequency band, as is wafer 51 in the antenna preselector section. The coils of mixer wafer 53 are mutually coupled to coils of wafer 52, as seen in Figure 4. Similarly, the wafer coils of oscillator section 54 are mutually coupled to the mixer wafer section 53, or additionally coupled thereto as indicated by the dotted arrow 154; or supplemented with a small capacitive coupling of the order of 0.5 mmf.

As will be understood by those skilled in the television tuner art, that when the control arms of the respective wafers are in the lowest position, corresponding to channel 2, the full series of coils (e.g. 133, 133 in wafer 51) are connected in their respective circuits, rendering the circuits of the tuner operative most efficiently at the channel 2. The heterodyning or mixing of the basic channel 2 frequency band, (namely, 54 to 60 megacycles) to the desired intermediate frequency (43.5 megacycles in the present case) also takes place in the indicated channel 2 position. The output circuit of mixer stage 44′ comprising plate electrode 155, is tuned to the IF frequency through adjustable inductor 156, and passed to the IF output terminal 157, for the television receiver. The plate supply to plate electrode 155 is afforded from the B+ source, through dropping resistor 158. Suitable neutralization of the plate circuit 155 is provided with inductance 160 and capacitance 161, as shown. Similarly, the operation of the frequency selector for each of VHF channels occurs by successive positioning of the ganged control arms of each of the inductor wafers, to the corresponding contactor jaw position along the serial coils, wherein each channel position affords the most efficient inductance by each wafer, 51 to 54, for operation at the selected channel, is understood by those skilled in the art.

The control grid 120 of amplifier stage 43′ is connected to the automatic gain control (AGC) of the television circuit through lead 162, and a suitable resistance 163, such as 3900 ohms. A suitable tube for double triode cascode stage 43, is the commercial type 6BQ7A. A by-pass condenser 164 connects AGC lead 162 to ground. Also a suitable resistance network is provided to the control grid of output section 43″ of the cascode unit 43 between B+ potential and ground, through a dropping resistor 165 such as 470 ohms. The network includes resistor 166 (such as 180,000 ohms); resistor 167 (such as 100,000 ohms); resistor 168 (such as 330,000 ohms); and a by-pass condenser 169 to ground.

The UHF section 170 contains the antenna preselection stage for UHF comprising variable condenser 62, 63; a further preselection-mixer stage comprising variable condenser 68, 69 and diode crystal 71; and the common oscillator stage comprising triode 44″ and variable condenser 73, 74. The rotors of the three aforesaid condensers, namely rotors 62, 68 and 73 are ganged together and controlled by the common control rod, indicated by dashed line **60*a* and already described in connection with Figures 4 and 5. UHF unit 170 is enclosed in suitable shielding, indicated by exterior sections 171, 172** through which connection is made to the internal circuits, in a manner known to those skilled in the UHF circuitry art.

The input to antenna preselector stage 180 of unit 170 is provided by leads 173, 174 connected directly to primary winding 114 of antenna transformer 115, through coupling condensers 175, 175. The coupling condensers 175, 175 in a preferred embodiment, each had a value of 4.7 mmf. At VHF frequencies these small condensers 175, 175 are practically an open circuit at leads 173, 174 for the VHF channels and did not affect the impedance of the primary winding 114 at VHF frequency operation. However, where UHF reception of the tuner 30 is desired, the secondary winding 116 of the antenna transformer 115 is open-circuited through the rotary switch 105′ and VHF impedance 114 on the primary winding is non-existent through the secondary winding 116. Also, the impedance of the primary winding 114 to the UHF frequencies is very high and has negligible effect in the conduction of UHF signals from the terminal input 40, 40 through the condensers 175, 175 to UHF input leads 173, 174. The small value condensers 175, 175 is sufficiently high for the UHF frequency band in the range 470 to 890 megacycles, acting substantially without impedance thereto, and providing effectively a direct connection between antenna input terminals 40, 40 and leads 173, 174 of the UHF unit 170.

The UHF antenna input lead 173 connects to an internal loop 176 in preselector section 180; the other lead 174 connects to UHF loop 177 internal of the shielded UHF unit 180. Both internal loops 176 and 177 are respectively grounded to the shielding, in the well-known UHF practice. The first preselector section 180 of unit 170 is coupled to the next successive preselector-and-mixer section 181, through an opening shielding panel 61 and lead 178. Rotor 69 of condenser 68, 69 of preselector section 181 is connected to mixer crystal 71 through lead 70. UHF oscillator section 182 of UHF unit 180 (comprising triode 44″, variable condenser 73, 74 and associated components) generates a suitable UHF frequency signal in compartment 182 subtended by shielding and partition 67. UHF oscillator signal from compartment 182 is coupled back into preselector-mixer compartment 181 through loop 183 and an opening in partition 67, with a small capacitor 184 such as the order of 3 mmf. connected in this loop.

Thus, a heterodyning action takes place across crystal 71 as a mixer, wherein a beat or resultant frequency occurs between a preselected UHF channel frequency (by condensers 62, 63 and 68, 69) and the oscillator frequency (determined by the setting of condenser 73, 74 of section 82). The system is designed to afford a signal output, at this heterodyning stage, equal to the intermediate frequency (IF) used in the VHF section (namely 43.5 megacycles in the aforesaid example). A suitable high frequency choke coil 72 connects the output of crystal 71 to the shielding of unit 170. The output lead 185 from mixer 71 connects the output signal from unit 170 to coil 186. Coil 186 in turn, is connected directly to the lower end of wafer 51, corresponding to the contact for channel 2. The IF signal (UHF) from lead 185 thus passes on through the series coils 133, 133 of wafer 51, through terminal inductor 134 and condenser 135, to the input grid 120 of cascode stage 43.

Figure 8:
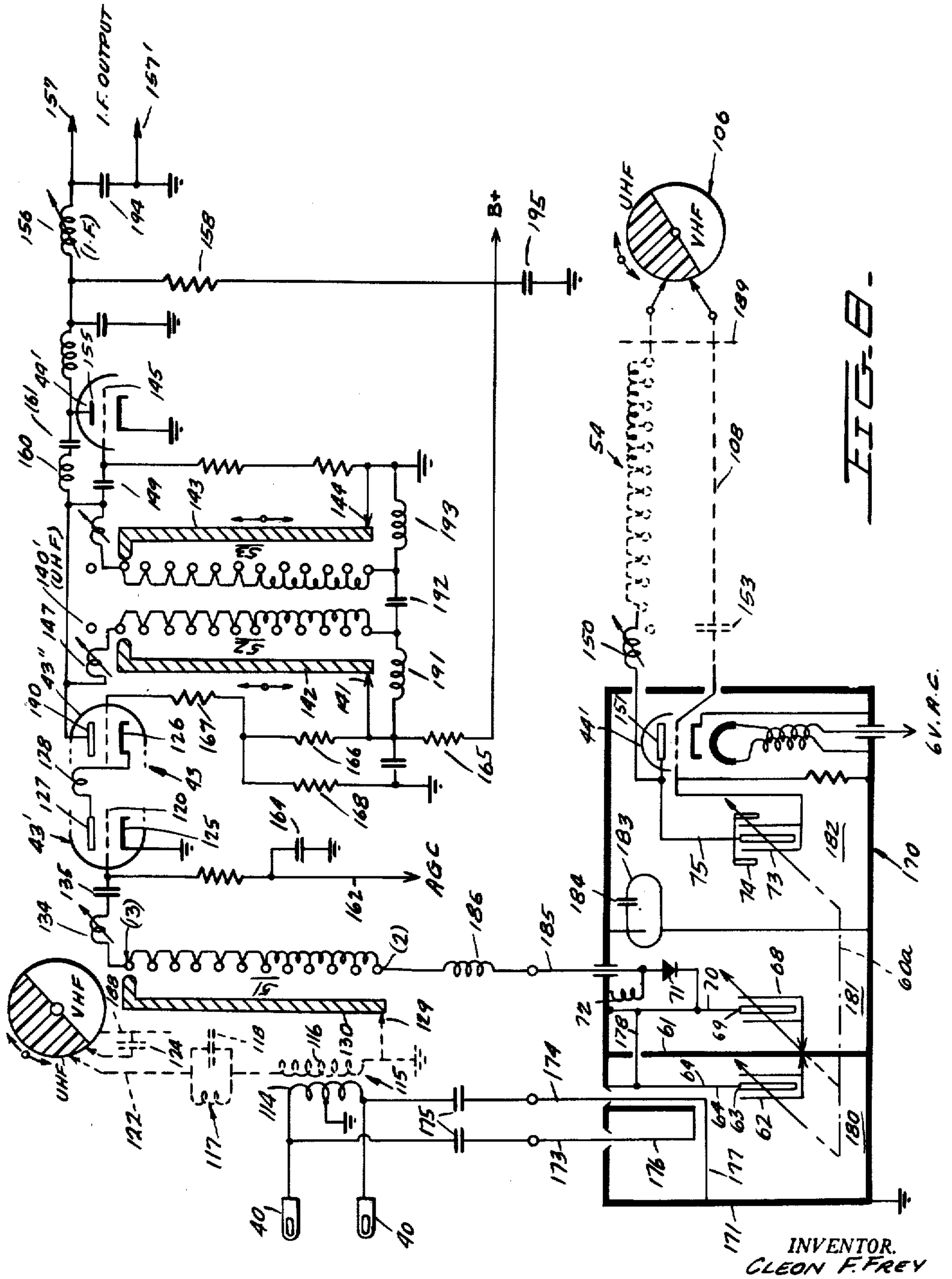
Figure 8 is a schematic electrical diagram of the tuner diagrammed in Figure 6, in UHF circuit connection.

Reference is now made to Figure 8 which is a schematic electrical representation of the circuit of Figure 6 with the control shaft tuned to the UHF position. The circuit of Figure 6 is herein circuitally changed to the UHF counterpart, for the UHF operation schematically shown in Figure 8. The wafer conductors 51 through 54 are herein shown as simple inductances, since the switching arms of the wafers are out of circuit with the inductances 133, 133 thereof. Figure 8 shows the resultant electrical effect of the wafers when the switch arms of wafers 51 to 54 are in UHF position 140′ (Figure 6). Simultaneously the 180° switches 105 and 106 are moved into their UHF position effecting circuit disconnection of their coacting contacts. The circuit portions disconnected by switch 105 at the antenna circuit and switch 106 oscillator circuit, are shown in dotted lines.

Figure 8 is presented to more clearly describe the circuit conditions and relations of the invention frequency selector, when operated into the UHF positions. The antenna transformer 115 is converted from the VHF action described in connection with Figure 6 to the following UHF action. The secondary winding 116 shown in dotted, is disconnected from the circuit during the UHF positions, by switch 105 opening the circuit (between connection lead 122 and coupling condenser 124) to the control grid 120, across the dotted barrier indicated at 188. Thus, no VHF antenna signals can pass to the input grid 120 of the cascode amplifier 43′ in view of the disconnection by switch 105, throughout the UHF frequency operation of the tuner 188 herein. On the other hand, the UHF signals from the antenna system connected to the terminals 40, 40 are automatically and efficiently passed directly to the UHF input 173, 174 of unit 170 through the small valve coupling condensers 175, 175 as aforesaid. The antenna transformer 115 is effectively a very high impedance across terminals 40, 40 for the UHF frequency band, and the UHF signals are passed on directly to the input leads 173, 174 to the antenna coupling loops 176, 177 of UHF preselector compartment 180. Hence, with no VHF signals entering preselector wafer 51 or control grid 120 of the cascode amplifier 43′, no VHF reception or operation of the tuner is possible in the UHF positions. The tuner 30 is in circuit connection solely for UHF operation when connected as in Figure 8.

The switch 106 when in the UHF positions as indicated in Figure 8 disconnects VHF oscillator wafer 54 from the oscillator triode 44″ electrically opening up the contacts coacting with its insulation portion. In effect switch 106 creates a barrier 189 between wafer inductor 54 and connection lead 108. The anode potential supply from source B+ to the plate electrode 151 of triode 44″ is continuously provided through dropping resistor 153 connected to the B+ supply, and through the terminal inductor 150. Terminal inductor 150 serves as the frequency determining element for the channel 13 oscillator frequency. In this UHF counterpart connection inductor 150 serves as an effective choke coil, preventing the passage of UHF signals from compartment 182 through to dropping resistor 153, or on to the wafer circuits 52 and 53 through the resistor 165. Thus, the UHF oscillator frequency signals are contained within compartment 182, and linked only to mixer compartment 181 through the loop 183 as set forth hereinabove.

A further important feature of the present invention is the automatic conversion of the VHF amplifier stage 43 and the VHF mixer stage 44′ as a two-stage cascade amplifier of the heterodyned UHF output at lead 185. This is accomplished by the circuit in the following manner: The output signal of UHF unit 170, as described above in the exemplary embodiment is at the system intermediate frequency (IF), namely 43.5 megacycles. The connection from output lead 185 to coil 186, is also in series with the full serial inductance of wafer 51 and end inductor 134. This series inductance 186, 51 and 134 connects directly to control grid 120 of amplifier 43′. The overall resonance to this circuit 186, 51 and 134 is such as to emphasize the passage of the 43.5 megacycle intermediate frequency to the input of the amplifier 43. This is made feasible by the addition of coil 186 to the full inductance of wafer 51 together with end inductor 134 which together are resonant at, or otherwise tuned, to the frequency band of channel 2, namely 54 to 60 megacycles. The additional inductance 186 is designed to lower the resonance of the combination 151, 134 to tune to the lower selected intermediate frequency (IF), 43.5 megacycles in the present example. Thus, the input of the amplifier stage 43 is converted to be tuned to the output of UHF unit 170 after heterodyning therein, namely of the selected UHF channel after conversion to the IF band. As already stated, the amplifier section 43 may be the cascode amplifier illustrated in Figures 6 and 8; or may be a neutralized triode, a suitable tetrode or a pentode, as desired.

The output section 43″ of the amplifier stage 43, at plate electrode 190, essentially comprises end inductor 147 in series with the full inductance of wafer 52, and the additional inductance 191. The value of inductance 191 is such as to afford a tuning response, or substantial resonance in the output circuit herein, in the intermediate frequency, namely 43.5 megacycles. Dropping resistor 165 provides suitable anode potential for plate 190. Similarly, the full inductance of wafer 53 in mixer stage input 44′ is in series between grid 145 thereof and with the end inductor 148. The additional inductance 192 in this series circuit is proportioned to afford a tuning resonance at the IF frequency for the herein stated circuit of mixer stage 44′. The mutual coupling between wafers 52 and 53 is reinforced by coupling condensers 192 and 193 wherein further amplification of the heterodyned UHF channel frequency is at IF and is amplified through this triode stage 44′. The output circuit of amplifier stage 44′ is normally tuned to the selected IF frequency, for both the VHF and UHF operation, through adjustable coil 156. The output of the coil 156 is connected to the IF section of the television receiver, through leads 157, 157′. A by-pass condenser 194 connects between leads 157 and 157′ and ground. A by-pass or filtering condenser 195 connects the B+ source to ground.

Figures 9, 10, 11, 12, 13, 14:
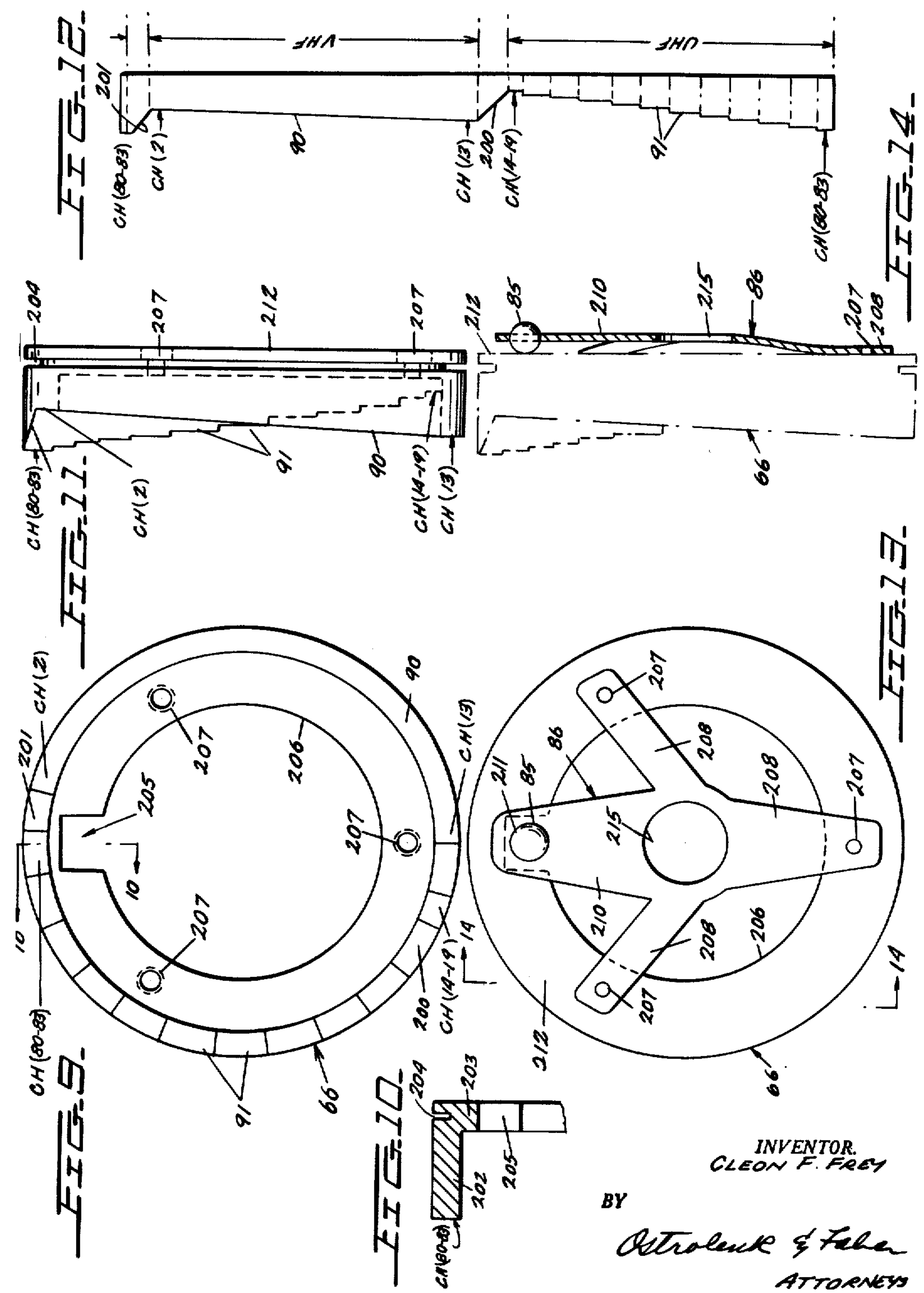
Figure 9 is a plan view of the control cam used in the exemplary tuner embodiment.
Figure 10 is a cross-sectional view of a portion of the cam of Figure 9, taken along the lines 10—10 thereof.
Figure 11 is a side elevational view of the cam of Figure 9.
Figure 12 is a 360° development of the cam of Figures 9 and 11.
Figure 13 is a bottom view of the control cam of Figure 9 with its detent spring secured thereto.
Figure 14 is a cross-sectional view through the cam of Figure 13, along the lines 14—14 thereof.

Figure 9 is a plan view of the control cam 66 shown and described in connection with Figures 4 and 5. The VHF cam surface 90 is a continuous surface between the positions for channel 2 and channel 13 as seen in the elevation of Figure 11 and the 360° development Figure 12. The first UHF sub-band namely channels 14 to 19 includes six UHF channels and is at the lowest of the twelve UHF steps 91 of cam 66. In the exemplary embodiment, each successive step 91 is spaced by a predetermined amount until the highest step corresponding to channels 80 to 83 is reached. The distance between each step 91 in this case was .031 inch. With eleven stepped spacings a swing of 0.341 inch was provided between first sub-band, channels 14 to 19, and the last UHF sub-band, namely channels 80 to 83. All the intermediate UHF sub-bands subtend six UHF channels in this embodiment, with the last or highest channel sub-band only four, 80 to 83, totaling the seventy assigned UHF channels.

Again it is to be understood that the assignment of the amount of channels to any sub-band herein is arbitrary, and may be in the uniform manner described or in any other fashion, as may be preferred. Since it is very unlikely that the Federal Communications Commission will assign more than one UHF frequency channel to stations in one geographic location within any of the herein stated sub-bands, utilization of the invention tuner for preselection of twelve UHF channels has been found feasible for any reception area. Should it, however, be desired to receive more than one UHF channel in any assigned sub-band herein, it is only necessary to move the fine tuning knob 33 to receive any or all of UHF channels in that sub-band. It is thus seen that the arbitrary selection of twelve sub-bands for the seventy channels may be varied in particular application and that any of the seventy assigned UHF channels may be received either discretely along the twelve positions, or, in some cases, within the particular sub-band, as circumstances or desirability dictates.

Further, in the exemplary embodiment, the rise of uniform cam surface 90 for the VHF channels between the lower position of channel 2 and the high position for channel 13 was .075 inch, corresponding to the cam displacement seen in developed Figure 12. One of the features of cam 66 is the provision of risers or steps between VHF and UHF bands. These risers are indicated at 200 and 201 in the figures. They afford a smooth transition to the discontinuous positions between channel 13 and the sub-band for channels 14 to 19; and between channel 2, and the sub-band subtending channels 80 to 83.

It is to be noted that the thickness of the cam for channel 13 and the sub-band of channels 80 to 83, namely the higher frequencies in both VHF and UHF bands respectively, are at the thickest point of the cam and therefore correspond to a maximum axial displacement, to the left, of the condenser displacement rod 60 (Figures 4 and 5). Such displacement to the left of rod 60 reduces the capacities of the respective condensers by moving their rotors 62, 68 and 73 outwardly from their corresponding stators 63, 69 and 74. Thus, the capacitance of each of the three tuning condensers of UHF unit 170 (Figures 6 and 8) is at the minimum capacity. Minimum capacitance of the condensers provides the higher frequencies. As is usual in tunable systems, the higher frequencies in a tuned circuit are provided by the smaller capacitance values.

In conjunction with such indicated displacement of the condensers, through the action of cam 66 on the condenser control shaft 60, the physical proportioning of the rotor and stator plates of the UHF condensers are designed to provide the correct frequencies as will be described in connection with Figures 18 and 19.

Figure 10 is a cross-sectional view through cam 66, along the line 10—10 of Figure 9, showing the cam surface vertical rise corresponding to channels 80 to 83 and the angular ring 202 corresponding to the cammed surface rising from the circular plate 203. An angular ridge 204 is provided within cam 66 for mounting and supporting purposes and an undercut 205 for mounting a suitable internal sleeve or bearing for the cam 66 within the circular opening 206 thereof. Three equally spaced holes, 207, are provided in cam 66 for suitable fastening of the flexible detent spring 86, shown in plan in Figure 13.

Figure 13 is the bottom view of the control cam 66 with the detent spring 86 secured in position thereon, across the holes 207, 207 by suitable fastening means such as screws or rivets. Spring 86 is made of a suitable flexible or spring material such as Phosphor bronze .015 inch thick. The three arms 208, 208 thereof are fastened to the points 207 of cam 66. A fourth arm 210 extends between two of the arms 208 and has a circular opening 211 through which a steel ball detent 85 projects, held between arm 210 and the bottom 212 of cam 66.

Figure 14 is a cross-sectional view along the line 14—14 of the cam assembly of Figure 13, showing how the spider spring 86 is bowed outwardly from the center of surface 212 of cam 66. The central portion 215 of spring 86 has a circular hole through which the control shaft 31 of the tuner passes. By suitably securing rim 215 of the central opening in spring 86, with respect to the control shaft and/or chassis of the tuner, the cam 66 is held mounted in rotational arrangement with control shaft 31 but flexible about a plane normal to the control shaft 31. This permits cam 66 to be angularly displaced at its rim, by control pin 96 as described in connection with Figures 4 and 5. The detent sphere 85 projecting from the spring arm 210 coacts with openings 32 in front face plate 48 of the tuner, as shown and described in connection with Figures 1 and 2.

Figure 15 is an elevational view partially in section of the fine tuning assembly described in connection with Figure 4, comprising hub 95 and frictional disc 94 secured at one end. A stop pin 100*a* is staked to disk 94 and serves to prevent the rotation of the fine tuning assembly beyond a 360° swing when abutting a stop lug 100 (Figure 4). Set screw 97 mounts in hub 95 to secure threaded stop pin 96 (Figures 4, 8 and 17) with the hub 95, in order that stop pin 96 may be rotated with rotation of disc 94.

Figure 16 is a face view of disc 94 secured to the hub 95, showing stop pin 100*a* therein. The cross-sectional view, through the fine tuning assembly (Figure 17) illustrates the unthreaded portion 215 of the stop pin 96, fastened to the hub 95 by set screw 97. A post 99 coacts with the interior bore of hub 95, and has a flange that mounts the fine tuning assembly between the hub 95 and post 99, through a suitable opening in chassis face 48 indicated in dotted lines. The threaded portion of control pin 96 coacts with internal threads in post 99, whereby rotation of disc 94 moves head 96′ of pin 96 against cam 66. The excursion of head 96′, in the exemplary embodiment was .040 inch overall, sufficient to tilt cam 66 over a complete sub-band of UHF channels. In the exemplary embodiment, each sub-band step 91 was .031 inch. Also the .040 excursion angularly of cam 66 was ample for fine tuning as required for VHF tuning.

As heretofore stated, the configuration and dimensions and spacing of the coacting rotor and stator plates of the three ganged condensers of UHF section 170 are designed to afford the desired frequency sub-bands and frequency continuity in the tuner, in conjunction with the designed movement of cam 66 and the displacement of control shaft 60. Figure 18 illustrates an exemplary embodiment for a stator plate 225, having an opening 226 suitable for mounting in a post 227. The effective surface of coaction for the stator plate 225 is the forward or left section 230, comprising tip 231 with the narrowest width and extending along the arcuate curvatures 232 and 233 with increasing width and corresponding increasing cross-sectional area towards the right side of plate 225.

The curvatures 232 and 233 define an area that coacts with the displacement of the associated rotor, to predetermine the capacitance of the combined stator and rotor and in turn the frequency of the circuit to which it is connected within UHF unit 170. Figure 19 shows an exemplary embodiment for the oscillator rotor plate 240 wherein its forward surface 241 is of sufficient width to subtend the maximum width across the face of the associated stator. A recess 242 in plate 240 is for mounting purposes to post 243. The remainder of the rotor plate 240 including the curvature 244 thereof, is substantially unimportant as long as the rotor 240 subtends the stator coacting therewith. Essentially, the curvature of the coacting sides 232 and 233 of the stator 225 determines the capacitance change of its condenser. The number of rotor plates and stator plates in a given condenser; their overall area; and the spacing between the plates, are a matter of choice to the designer. The parameters of the circuits using these UHF condensers, and the frequency range required with attendant displacements of the rotors through rod 60 determined the aforesaid variable factors for the condenser elements. In the exemplary embodiment, the material for the rotors 240 and stator plates 225 was dead soft copper .035 inch thick, with a finish of silver plating .0002 inch minimum thickness.

The basic design of the UHF condensers, as aforesaid, provide the necessary capacitance displacement in each of the three circuits 180, 181, 182 of the UHF unit 170 (Figure 8) through the corresponding condensers 62—63, 68—69 and 73—74 to produce the requisite frequency operations as heretofore described. Thus, in UHF operation, the cam steps 91, in the exemplary embodiment, are spaced .031 inch. The condenser rod 60 is thereupon moved axially by .031 inch between each sub-band of six UHF channels. The design and shaping of the condensers thus provide a frequency change, throughout the UHF spectrum of 470 to 890 megacycles (channels 14 to 83) of at least 36 megacycles for each .031 inch axial shift. The fine tuning displacement by control pin 96 provides the close final adjustments for each channel in the sub-bands.

Correspondingly, when the tuner is connected for VHF operation, the UHF oscillator condenser 73, 74 is merely supplemental to the basic VHF frequency determinant, namely inductance wafer 54. The VHF oscillator parameters are proportioned whereby the UHF condenser 73, 74 that remains in the circuit varies each of the VHF channel frequencies by the order of ±2 megacycles (for fine tuning) throughout the selected displacement range of pin 96, e.g. .040 inch. The rise and location of the VHF cam surface 90 on cam 67 controls the operation of condenser 73, 74 to suitable axial position and values in correspondence with the selected VHF channels.

Figures 20 to 25 illustrate a modified form of the present invention, whereby one particular UHF channel in each sub-band (of six channels, herein) is preselected for operation when the sub-band is tuned in position.

Figure 21:
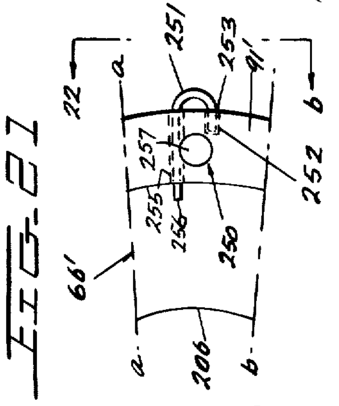
Figure 21 is an enlarged plan view of a detail of the cam of Figure 20, corresponding to the portion between lines *a* and *b* thereof.
Figure 20:
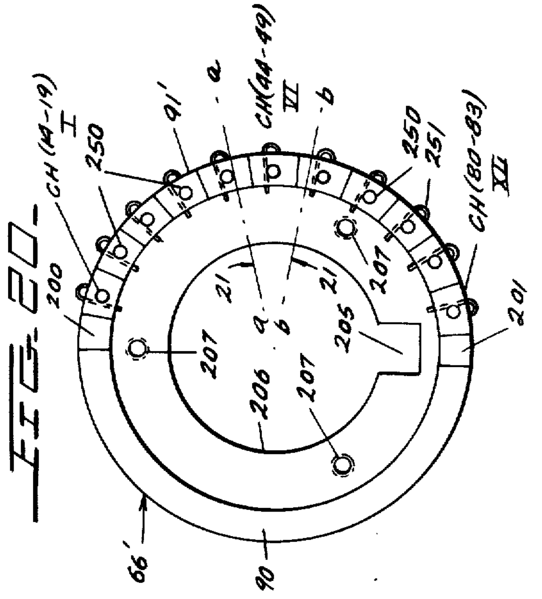
Figure 20 is a plan view of a modified control cam.

Figure 20 is a plan view of the cam 66' incorporating an adjustment or set screw 250 in each of the twelve sub-band positions 91' along the UHF half of the cam. Figure 21 is an enlarged plan view of a section of cam 66' showing one of the sub-band position (position VI) corresponding to sub-band (channels 44 to 49). The other sub-band positions 91' are similar and may be designed to subtend more less than six channels each, as aforesaid.

Figure 23:
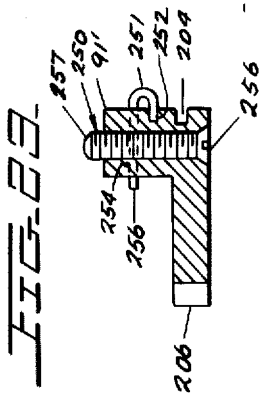
Figure 23 is a cross-sectional view through Figure 22, taken along the line 23—23 thereof.
Figure 24:
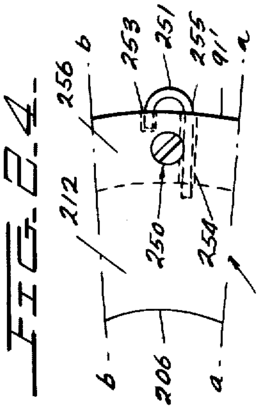
Figure 24 is a bottom view of the cam of Figure 22.
Figure 22:
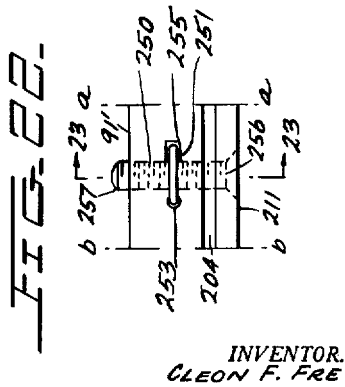
Figure 22 is an end view of the cam portion of Figure 21, corresponding to the view along the line 22—22 in the direction of the arrows.

The adjustment screws 250 are set from the rear 212 of the cam by a screwdriver, similar to the practice of maximizing the response of individual tuning elements in a turret tuner for each VHF channel, as shown in the patent referred to. Figures 22 and 23 show how each adjustment screw 250 projects above the cam top surface 91', for coaction with condenser rod 60, to be described. A lock spring 251 is provided to hold or otherwise clamp each screw 250 into its adjusted position in cam 66'. The looped end 252 of each spring 251 is set in a hole 253 in the side of cam 66' adjacent to each screw 250.

The body 254 of each spring 251 presses into a threaded portion of its corresponding adjusting screw 250, to lock the screw in any preset position. Each spring body 254 is located in a slotted opening 255 in the cam, adjacent each screw 250. The tip 256 of spring body 254 may project from the cam face as shown. Each adjustment screw 250 has a slotted head portion 256 (Figure 24) whereby a service man installing the television receiver adjusts the setting of any screw 250, as will be set forth. The rolled or rounded head 252 of each adjustment screw 250 coacts with the end 60" of condenser control rod 60, as shown in Figure 25.

Figure 25:
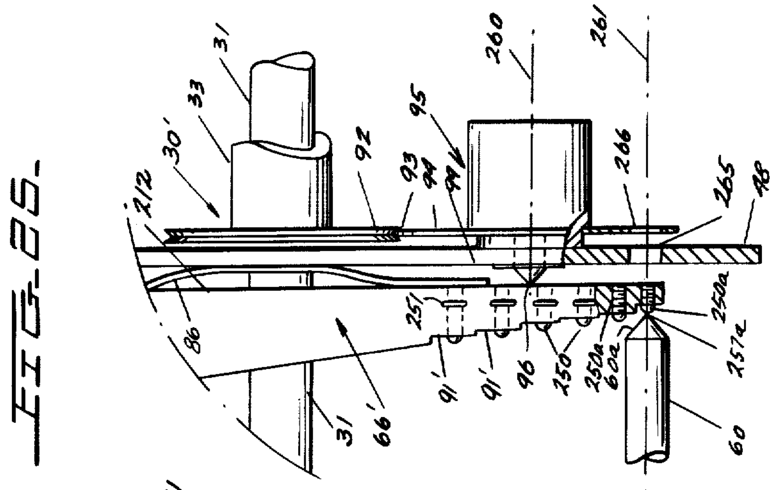
Figure 25 shows a section of a television tuner, partially broken away, incorporating the modified control cam of Figure 20.

A portion of a television tuner 30', embodying the pre-settable cam 66' of Figures 20 to 24, is illustrated in Figure 25. It is to be understood that the remainder of tuner 30' may be essentially identical to the heretofore described tuner 30. Cam 66' is rotated by control shaft 31 to the twenty-four preset detented angular positions, as set forth for cam 66. Detent spring 86 maintains the back surface 212 of cam 66 in pressure against the head of control pin 96. However, in this form of the invention (Figure 25) the longitudinal axis 260 of control pin 96 and its associated fine tuning mechanism 95 is offset from the longitudinal axis 261 of the condenser control rod 60.

Tuning control shaft 31 rotates cam 66' into the discrete tuning positions (24 herein) wherein for each of the twelve UHF positions 91' a corresponding screw 250*a* is positioned for coaction with control rod 60, whereby the axis of the screw 250*a* is moved into the axial line 261. The rolled head 257*a* of the positioned screw 250*a* in cam 66' becomes juxtaposed with the rounded head 60*a* of rod 60, along axis 261, as shown in Figure 25. The axial position of screw 250*a* in cam 66' in turn determines the axially displaced position of rod 60 when in coaction with screw head 257*a*. The setting of the UHF condensers is activated by control rod 60, and in turn is predetermined by the presetting of screw 250*a* for the selected UHF position.

Any desired UHF channel in the sub-band assigned by each position 91, may be preselected by its associated adjustment screw 250. Thus, whenever the control shaft 31 moves cam 66' to a UHF sub-band position, the UHF channel, to which the corresponding screw 250 is preset, will be tuned in and "received" by the tuner 30'. Presetting the screw 250 of any sub-band 91' is accomplished by moving the control shaft 31 to the detented position, corresponding to the reception of the particular UHF channel, as noted on the tuning dial. Such setting of cam 66' brings the associated sub-band 91' portion of the cam opposite rod 60, with its screw 250*a* in its axis 261. An opening 265 is in front end 48 of the tuner along the axis 261. A corresponding hole 266 in friction disc 94 of the fine tuning mechanism 95 is aligned in the axial 261 position. Access to the slotted end 256 of screw 250*a* is afforded through openings 265 and 266 on axis 261.

Screw driver presetting of adjusting screw 250*a* is now feasible, from the front of the exterior of the television set, in the usual VHF practice. The final adjustment of screw 250*a* for the desired UHF channel is accomplished by its presetting to where actual clearest reception of the desired channel is apparent on the receiver screen. The lock spring 251 for the screw 250*a* maintains it in its presetting. Thus, whenever the operator turns control shaft 31 to the dial position (not shown) for a selected UHF channel, the corresponding preset screw 250*a* motivates rod 60 to the exact tuning position for that channel.

It is to be understood that the twelve UHF sub-band positions 91' on cam 66' may be progressively arranged in any desired numerical sub-band sequence. Also, in the little likely case where two or more UHF channels fall within one sub-band, such channels may all be independently preset with any of the screws 250, regardless of their assigned sub-bands. The diameter of the head 60*a* of rod 60 is sufficiently large to readily subtend any spacings between the heads 257 of screws 250, so that smooth coaction occurs between rod 60 with screws 250 in all instances of usage.

The fine tuning pin 96 is located away from axis 261, so as to permit the external presetting of screws 250 described hereinabove. Nevertheless, pin 96 is located in its axial path 260 away from axis 261 and abuts cam 66' to displace cam 66' for fine tuning for both the VHF and UHF channels. The fine tuning displacement super positioning of rod 60, through tilting of cam 66' by pin 96, is similar to the corresponding fine tuning action by condensers 73, 74 as set forth hereinabove for tuner 30. In the case of tuner 30' herein, the fine tuning control through sleeve 33, serves only as fine tuning means for all the eighty-three channels, as the function of preselection of the UHF channels within the sub-bands is performed by preset screws 250 on cam 66'.

While the present invention has been shown and described in connection with preferred and exemplary embodiments thereof, it is to be understood that variations thereof are feasible within the broader spirit and scope of the invention, and that it is accordingly not intended to be limited except as set forth in the following claims.

I claim:

1. A channel selector operable over the UHF signal band comprising a circuit section for preselecting and heterodyning broadcast channels in the UHF band, a rod coupled to said circuit section and longitudinally displaceable for tuning the section to desired channels, a face cam arranged substantially perpendicularly to said rod with successive steps coactable with an end of said rod, said rod end being spring pressed against the cam steps for controllable displacement thereby, said cam steps defining tuned-in channel positions for said rod progressively spaced to establish predetermined sub-bands of UHF channels in the UHF band that are tunable at each step coaction, a tuning shaft, spring means connecting said face cam for rotational displacement with said tuning shaft and permitting tilting of the cam face in the rod longitudinal direction, a detent defining successive rotational displacements of the face cam by said tuning shaft to correspond with the cam steps successively engaging said rod end for longitudinal displacements that tune the circuit section to the corresponding sub-bands, and mechanism engaging said face cam for controllably tilting it relative to said rod and thereby tune-in a desired channel within a sub-band selected through the tuning shaft.

2. A channel selector as claimed in claim 1, in which the spring means is a flat spring generally parallel to the face cam.

3. A channel selector as claimed in claim 1, in which the spring means is a flat spring generally parallel to the face cam with radial arms secured to the cam body and its central region to the tuning shaft.

4. A channel selector as claimed in claim 1, further including a sleeve concentric about the tuning shaft and a disc extending therefrom in frictional engagement with the mechanism for controlling the individual channel tuning within the sub-bands.

5. A channel selector as claimed in claim 1, in which the mechanism comprises a threaded pin and a stationary post within which the pin is longitudinally displaced for contact with the cam.

6. A channel selector as claimed in claim 5, in which the pin contacts the side of said cam opposite to the side that the rod presses the cam.

7. A channel selector as claimed in claim 1, in which the mechanism comprises a threaded pin and a stationary post within which the pin is longitudinally displaced for contact with the cam, a circular plate concentric about said pin and secured thereto, and a sleeve concentric about the tuning shaft and a disc extending therefrom in frictional engagement with the circular plate for controlling the individual channel tuning within the sub-bands.

8. A channel selector as claimed in claim 7, in which the pin contacts the side of said cam opposite to the side that the rod presses the cam, said pin and rod being in axial alignment.

References Cited in the file of this patent

UNITED STATES PATENTS

| | | |
|---|---|---|
| 2,166,532 | Naden | July 18, 1939 |
| 2,238,752 | Rinia et al. | Apr. 15, 1941 |
| 2,484,331 | Bels | Oct. 11, 1949 |
| 2,526,610 | Piton | Oct. 17, 1950 |
| 2,551,228 | Achenbach | May 1, 1951 |
| 2,572,964 | Wulfsberg | Oct. 30, 1951 |
| 2,580,051 | Torre et al. | Dec. 25, 1951 |
| 2,584,120 | Fyler | Feb. 5, 1952 |
| 2,596,117 | Bell et al. | May 13, 1952 |
| 2,598,857 | Sziklai | June 3, 1952 |
| 2,627,579 | Wasmansdorff | Feb. 3, 1953 |
| 2,688,086 | Schlessinger | Aug. 31, 1954 |
| 2,694,150 | Bussard | Nov. 9, 1954 |
| 2,772,355 | Deutsch | Nov. 27, 1956 |
| 2,786,135 | Garrigus et al. | Mar. 19, 1957 |
| 2,833,926 | Silvey et al. | May 6, 1958 |
| 2,839,936 | Dawson | June 24, 1958 |
| 2,856,780 | Hemphill et al. | Oct. 21, 1958 |

OTHER REFERENCES

Article: "The Standard Coil 820 Channel Tuner" by Buchsbaum Radio & Television News, September 1953, pages 35, 36, 37, 180, 181, 182.

Article: "A VHF-UHF Television Turret Tuner" by Murakami, RCA Review, September 1953, pages 318 to 340.